(12) United States Patent
Matsumoto et al.

(10) Patent No.: US 7,611,430 B2
(45) Date of Patent: Nov. 3, 2009

(54) TRANSMISSION SYSTEM FOR A BICYCLE, AND BICYCLE INCORPORATING SAME

(75) Inventors: Shinya Matsumoto, Saitama (JP); Kazunari Iguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 571 days.

(21) Appl. No.: 11/229,076

(22) Filed: Sep. 16, 2005

(65) Prior Publication Data
US 2006/0068956 A1   Mar. 30, 2006

(30) Foreign Application Priority Data
Sep. 30, 2004   (JP)   ............... 2004-287689

(51) Int. Cl.
*F16H 9/00* (2006.01)
(52) U.S. Cl. .......................... 474/80; 474/82
(58) Field of Classification Search ................. 474/80, 474/82; 74/606 R
See application file for complete search history.

(56) References Cited

U.S. PATENT DOCUMENTS

| | | | | |
|---|---|---|---|---|
| 1,500,579 | A * | 7/1924 | Eager | 105/101 |
| 5,873,590 | A * | 2/1999 | Abe et al. | 280/259 |
| 2004/0014543 | A1 | 1/2004 | Van Der Linde | |
| 2004/0130120 | A1* | 7/2004 | Matsumoto et al. | 280/260 |
| 2005/0173889 | A1 | 8/2005 | Matsumoto et al. | |
| 2005/0176537 | A1 | 8/2005 | Matsumoto et al. | |
| 2005/0176538 | A1 | 8/2005 | Morita | |
| 2005/0215367 | A1* | 9/2005 | Thomasberg | 474/78 |
| 2006/0046881 | A1 | 3/2006 | Matsumoto et al. | |

FOREIGN PATENT DOCUMENTS

| | | |
|---|---|---|
| EP | 1 564 129 A | 8/2005 |
| EP | 1564126 A1 | 8/2005 |
| EP | 1564128 A2 | 8/2005 |
| EP | 1630091 | 3/2006 |
| JP | 2004-155280 | 6/2004 |
| JP | 2005-225293 | 8/2005 |
| WO | WO 0208050 A1 | 1/2002 |

* cited by examiner

*Primary Examiner*—Bradley T King
*Assistant Examiner*—Stephen Bowes
(74) *Attorney, Agent, or Firm*—Carrier, Blackman & Associates P.C.; William D. Blackman; Joseph P. Carrier

(57) ABSTRACT

A transmission system includes transmission case having a work opening formed therein and configured to avoid the necessity for enlarging a transmission case, to prevent an increase in weight and to prevent and inhibit a reduction in the rigidity of the transmission case due to the presence of the work opening. The work opening provides a point of access to permit manual linking/unlinking of an operation cable to/from a derailleur, while ensuring easy oil lubrication for a chain through the work opening. The transmission system also comprises a sprocket cluster constituted of a plurality of transmission sprockets, and a derailleur. The work opening is formed in an axially directed case wall, which is located closest in the axis direction to a transmission sprocket having the largest outer diameter among the sprocket cluster. The same transmission sprocket is located closest in the radial direction to the work opening.

20 Claims, 6 Drawing Sheets

TRANSMISSION SYSTEM FOR A BICYCLE, AND BICYCLE INCORPORATING SAME

CROSS-REFERENCE TO RELATED APPLICATIONS

The present invention claims priority under 35 USC 119 based on Japanese patent application No. 2004-287689,filed on Sep. 30, 2004. The subject matter of this priority document is incorporated by reference herein.

BACKGROUND OF THE INVENTION

1. Field of the Invention

The present invention relates to a transmission system for a manually powered transport apparatus, such as a bicycle or the like. The transmission system includes a sprocket cluster, including a plurality of transmission sprockets, and a changing mechanism provided for shifting a chain from one transmission sprocket to another, along the sprocket cluster, in response to selected movement of an operation cable. The transmission system also includes a case for housing the sprocket cluster, the changing mechanism and the chain.

2. Description of the Background Art

Some known transmission systems including a case, a sprocket cluster, and a changing mechanism have previously been patented. As one example of a previously known transmission system, the bicycle transmission system disclosed in Japanese Laid-Open Patent No. 2004-155280,for example, includes a plurality of transmission sprockets with different outer diameters, a derailleur, for changing a chain from one transmission sprocket to another among the transmission sprockets upon operation of a wire for transmission operation, and a case for housing the sprockets, the chain and the derailleur. The transmission sprockets of the system disclosed in this reference are arranged along a transmission sprocket axis, in the order of decreasing outer diameter from left to right. The derailleur of the transmission system disclosed in Japanese Laid-Open Patent No. 2004-155280 includes a derailleur axle which is arranged along the transmission sprocket axis direction and is fixed to the case, and a derailleur arm which supports a guide pulley and is supported by the derailleur axle so as to be swingable. Upon operation of a wire, to which an operation component is connected, the derailleur arm and guide pulley swing around the derailleur axle, and move in the axis direction. The operation component can move axially in a housing hole provided inside the derailleur axle. Further, the operation component is fixed to the derailleur arm and engaged with a pin inserted through a guide hole provided in the derailleur axle. Since the derailleur is housed inside of the case in the transmission system of the reference, the operations of linking the operation component to the wire, linking the wire to the pin by use of the operation component, and releasing these linkages are performed through an opening provided in the right side wall of the case. After these linking operations are finished, the opening is plugged with a cap.

In Japanese Patent Laid-Open No. 2004-155280 described above, among the plurality of transmission sprockets, a transmission sprocket which has the smallest outer diameter and is located closest to the opening in the axis direction, is located farthest from the opening, in the direction orthogonal to the axis direction and in the radial direction. In contrast, a largest diameter transmission sprocket, which is located closer in the radial direction to the opening than the smallest diameter transmission sprocket, is located farthest to the opening in the axis direction. For this reason, the distance between the opening and the chain becomes large, when the chain is wrapped around either the largest or smallest diameter transmission sprocket. Thus, the opening needs to be enlarged in order to provide oil to the chain therethrough. However, enlargement of the opening entails a reduction in the rigidity of the case, and therefore the case itself needs to be enlarged, or the thickness of the case needs to be increased, in order to ensure required rigidity. However, adoption of such measures is problematic to some extent, because it makes the case bigger, and thus increases the weight of the case.

SUMMARY OF THE INVENTION

The present invention was accomplished in light of the circumstances described above, and an object of the present invention is to avoid the necessity for enlarging a transmission case, in order to prevent an increase in weight, and to maintain the rigidity of the transmission case despite the presence of a work opening formed in the transmission case. The opening permits linking/unlinking an operation cable to/from a linking part of a changing mechanism, while ensuring easy oil lubrication for a chain through the work opening. A further object of the invention is to increase flexibility in the selecting a region of the case where the work opening can be formed. A further object of the invention is to permit easy linking and unlinking of the operation cable to and from the linking part, respectively. A still further object of the invention is to easily check the connecting condition between the operation cable and the linking part.

According to a first aspect of the invention, a transmission system for a manually powered transport apparatus includes a sprocket cluster, including a plurality of transmission sprockets having different outer diameters and arranged along a common axis. The transmission system also includes a changing mechanism for allowing a user to move a chain from one transmission sprocket to another, among the sprocket cluster, in response to the operation of an operation cable. The transmission system further includes a transmission case for housing the sprocket cluster, the changing mechanism and the chain. The transmission case is provided with a work opening, through which the operation cable and a linking part of the changing mechanism are accessible so as to be manually connected or disconnected from one another. The transmission system is characterized in that the work opening is formed in an axially directed case wall (in other words, a case wall oriented in a direction normal to the axis direction) which is located closest in the axis direction to a largest diameter transmission sprocket of the sprocket cluster. The transmission system is further characterized in that the largest diameter transmission sprocket is also located closest in the radial direction to the work opening.

In this aspect of the present invention, the distance in the axis direction between the work opening and the chain is smallest when the changing mechanism causes the chain to be wrapped around the largest diameter transmission sprocket, and additionally the largest diameter transmission sprocket is located closest in the radial direction to the work opening. Thus, oil lubrication can be easily provided to the chain through the work opening, eliminating the need to enlarge the opening for oil lubrication.

According to a second aspect of the invention, in addition to the features of the first aspect, the operation cable extends inside and outside of the transmission case while passing through an operation opening formed in the transmission case, and the operation opening is formed in a radially directed case wall which faces the linking part in the radial direction.

In this second aspect of the invention, in the transmission case the operation opening is formed in the axially directed case wall (in other words, the case wall oriented in a direction normal to the axis direction) in which the work opening is formed, thereby easing the restriction on the formation of the work opening in the axis direction-case wall.

According to a third aspect of the invention, in addition to the features of the first and second aspects, the changing mechanism includes an operation member which is operable to move the chain axially toward a target sprocket, upon which the chain will ride, when shifting the chain from one transmission sprocket to another. In addition, a linking part is provided on the operation member and protrudes axially therefrom toward the work opening.

In this invention, the linking part protrudes axially from the operation member and thereby extends axially toward the work opening.

According to a fourth aspect of the invention, in addition to the features of any of the first, second, or third aspects, the linking part gets axially closer to the work opening where either the largest diameter transmission sprocket, or any transmission sprocket located between the linking part and the largest diameter transmission sprocket, is selected as a target sprocket towards which the changing mechanism shifts the chain.

In the practice of the present invention, it is possible to move the linking part axially towards the work opening by operating the changing mechanism to cause the chain to be wrapped around, among the sprocket cluster, any transmission sprocket that is located closer in the axis direction to the largest diameter transmission sprocket, preferably by operating the changing mechanism to cause the chain to be wrapped around the largest diameter transmission sprocket.

The invention according to the first aspect thereof has the following effect. That is, since there is no need to enlarge the work opening for lubrication operation, it is possible to minimize the size of the work opening and to maintain the rigidity of the transmission case due to the presence of the work opening, while ensuring easy oil lubrication for the chain. Thus, it is also possible to avoid the necessity for enlarging the transmission case and to prevent an increase in weight while ensuring a required rigidity.

The invention according to the second aspect thereof has the following effect in addition to the above-recited effect of the first aspect of the invention. That is, since increased flexibility can be achieved in the selection of region in the axially directed case wall where the work opening can be formed, the opening can be formed in a region which is appropriate for linking/unlinking the operation cable to/from the linking part and also appropriate for lubricating the chain, facilitating the link/unlink operation and a lubrication operation.

The invention according to the third aspect thereof has the following effect in addition to the above-recited effect of the first and second aspects of the invention. That is, since the linking part gets closer to the work opening, the link/unlink operation and the lubrication operation is further facilitated.

The invention according to the fourth aspect thereof has the following effect in addition to the above-recited effect of any of the first, second, or third aspects of the invention. That is, since the changing mechanism can cause the linking part to get closer to the work opening, when performing the lubrication operation, the connecting condition between the operation cable and the linking part can be checked easily.

Modes for carrying out the present invention are explained below by reference to an illustrative embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE
ILLUSTRATIVE EMBODIMENTS

Hereinafter, a number of selected illustrative embodiments of the present invention will be described, with reference to FIGS. 1 to 8.

It should be noted that in this specification and scope of claim the terms "axis direction", "radial direction" and "circumferential direction" respectively mean a direction in which the centerline L3 of rotation of each of transmission sprockets 41 to 47 extends, a radial direction around the center line L3 of rotation and a circumferential direction around the center line L3 of rotation, and the term "viewed from the side" means to view in the axis direction. Furthermore, in the embodiment, positional descriptions of the upper, the lower, the front, the rear, the left and the right respectively match the upper, the lower, the front, the rear, the left and the right of the bicycle B or the apparatus with the transmission system thereon, considered from the vantage point of a vehicle operator seated on the apparatus and facing forward.

Figure 1:
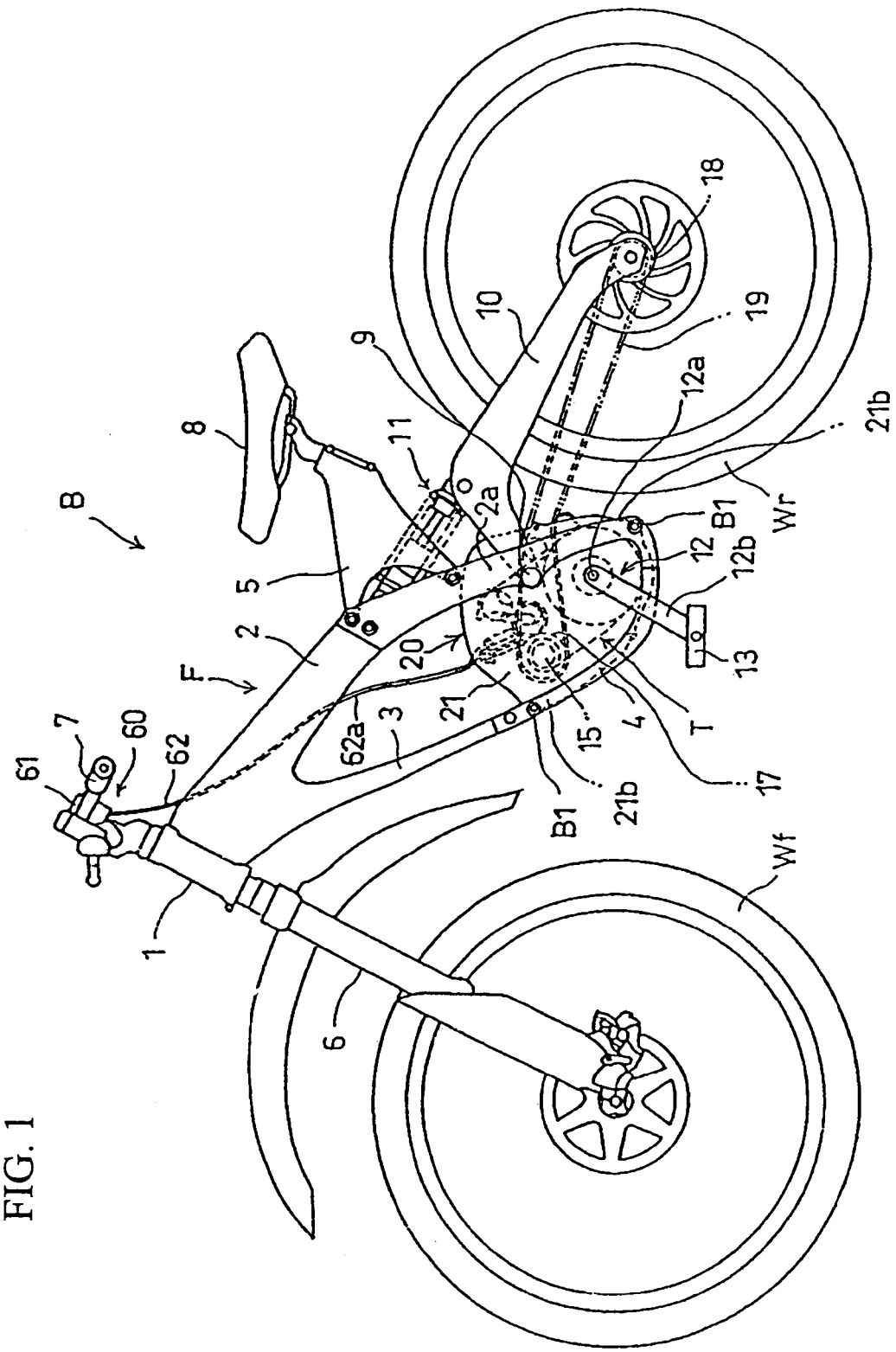
FIG. 1 is a left side plan view of a bicycle, including a transmission system according to a selected illustrative embodiment of the present invention.

With reference to FIG. 1, a bicycle B is provided with a transmission system T according to a selected illustrative embodiment of the present invention. The bicycle includes a bicycle frame F; a crankshaft 12 mounted with pedals; a transmission system T including an output axle 15 which is driven to rotate by power transmitted after a transmission gear shift is performed, and a drive-power transmitting mechanism.

The bicycle frame F includes a head pipe 1, which rotatably supports the shaft of a front wheel Wf in the lower end of the head pipe 1, and supports a front fork 6 having a handlebar 7 at the top so that the front fork 6 can be steered. The frame F includes a pair of mainframes 2 which are arranged side by side, obliquely extending from the head pipe 1 downwards to the rear, and down-tubes 3 which obliquely extend from the front ends of the respective two mainframes 2 downwards to the rear. The frame F also includes a pair of under-tubes 4 which are arranged side by side and connect rear ends of the two main frames 2 to rear ends of the down-tubes 3, and a saddle frame 5 which extends from each of the main frames 2 to support a saddle 8.

Front ends of a pair of swing arms 10, arranged side by side and which rotatably support a shaft of the a rear wheel Wr, are swingably supported by a pivot axle 9 (see also FIG. 3) that is provided commonly to rear parts 2a of the two main frames 2 through an axle attached to rear ends of the pair of swing arms 10. The two swing arms 10 are joined respectively to the two main frames 2 through a rear suspension 11. Thereby, the two swing arms 10, along with the rear wheel Wr, can swing up and down about the pivot axle 9.

The transmission system T is bolted to the frame F and includes a transmission case 20, which houses a transmission mechanism M1, a derailleur 70. The transmission case 20 has a crankshaft 12 and an output axle 15 extending therethrough, both of which are rotatably supported by the transmission system T, and are arranged in a space located in a lower portion of the bicycle frame F, created by the rear parts 2a of the two main frames 2 and the two under-tubes 4. In addition, the drive-power transmitting mechanism is arranged on the right side of the bicycle frame F.

Figure 2:
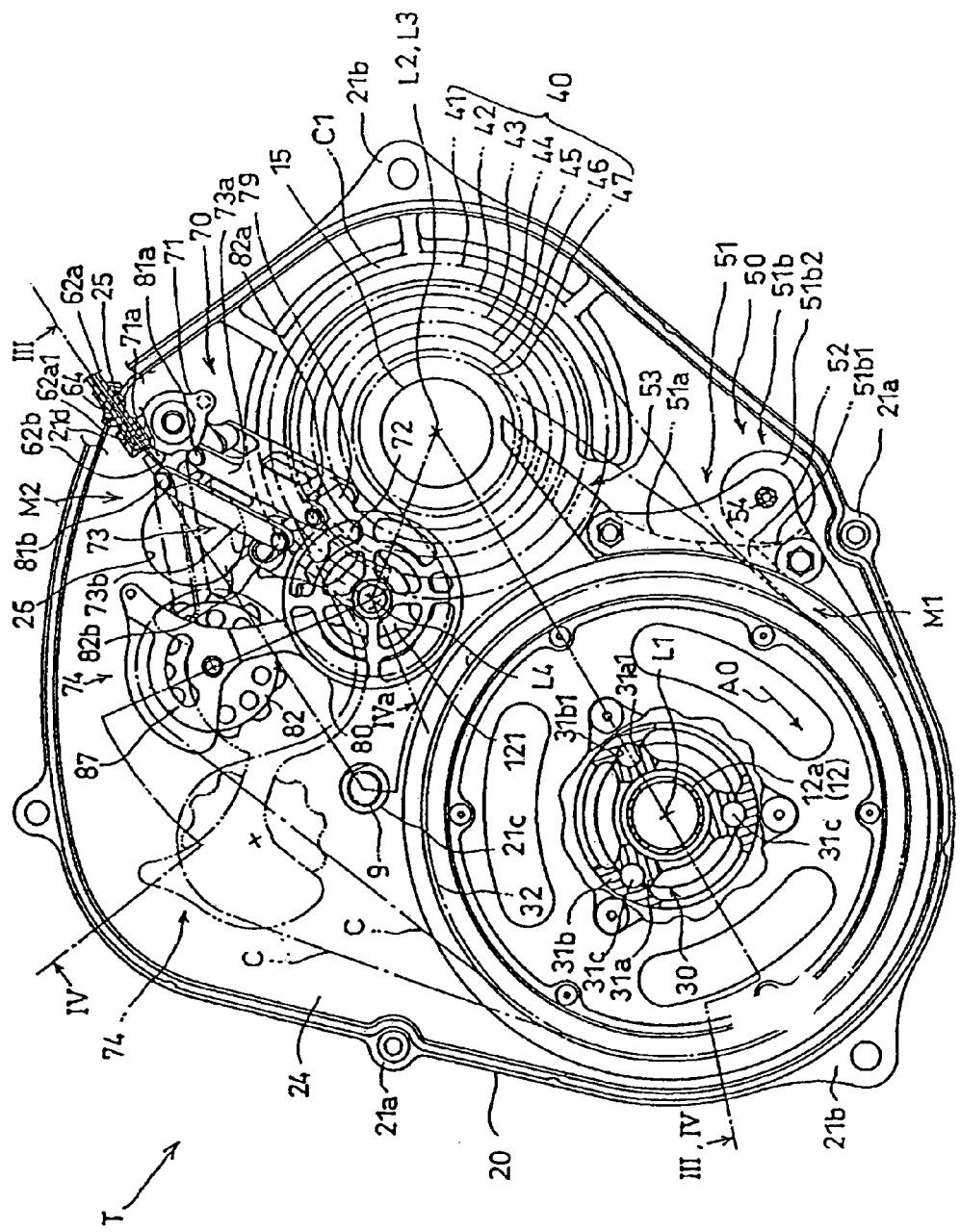
FIG. 2 is a cross-sectional view of the of the transmission system of the bicycle depicted in FIG. 1, taken along a vertical sectional plane and seen in a viewing direction of arrow II of FIG. 4.

With reference to FIG. 2 in combination, the transmission system T includes a metal transmission case 20 which is constituted of a first case component 21 as the left case and a second case component as the right case and where an enclosed, or almost enclosed internal space 24 is formed therebetween. The case components 21 and 22 are a pair arranged side by side and joined together with bolts (not shown) at two bosses (FIG. 2 shows a boss 21a of the first case component 21) formed in the peripheral portions thereof. The metal transmission case 20 is fixed to each of the two main frames 2 and to each of the two under-tubes 4 with bolts B1 at a pair of attachment parts (FIGS. 1 and 2 show the attachment part 21b of the first case component 21) formed in the peripheral portions respectively of the case components 21 and 22.

Figure 3:
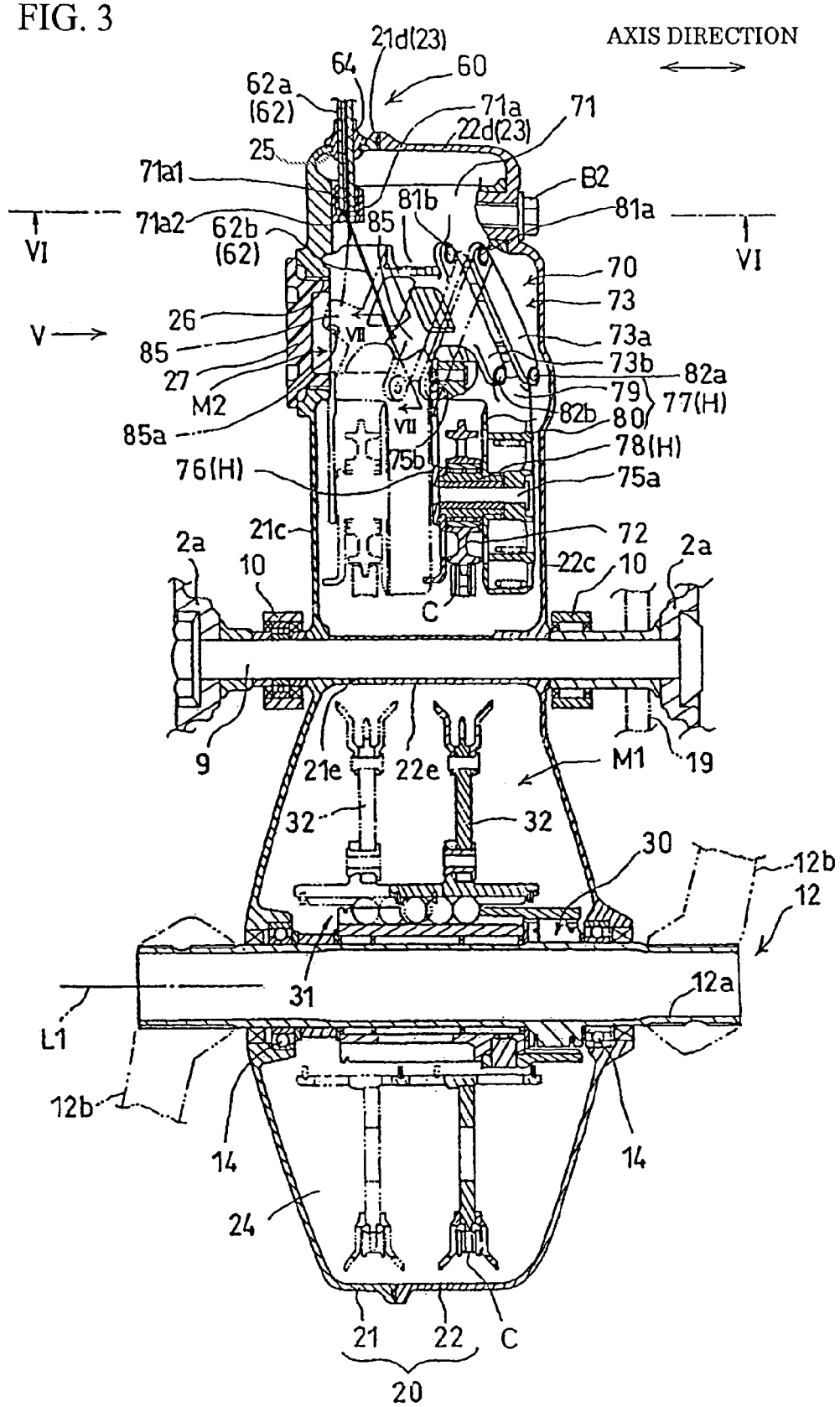
FIG. 3 is a cross-sectional view of the transmission case taken along the III-III line in FIG. 2, and shows a cross-section of parts of a derailleur.
Figure 4:
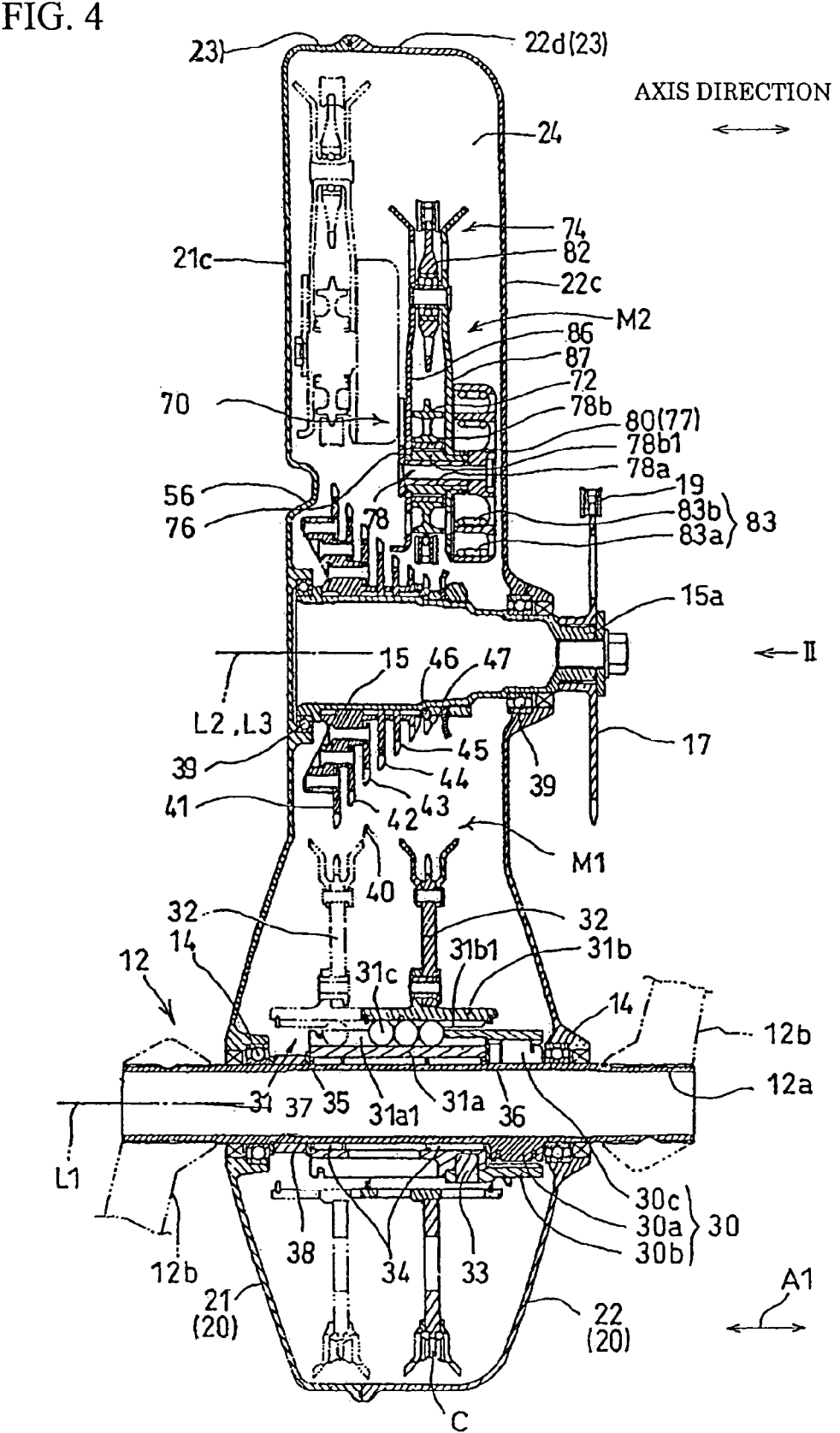
FIG. 4 is a cross-sectional view of the transmission case taken along the IV-IV line in FIG. 2, and shows a cross-sectional view of parts of the derailleur which is taken along the IVa line in FIG. 2.

With reference to FIGS. 3 and 4 in combination, the transmission case 20 includes first and second axially directed case walls 21c and 22c which are arranged side by side and face each other in the axis direction, and a radially directed case wall 23, which is connected to the circumferences of both of the axially directed case walls 21c and 22c, and which extends substantially along the axis direction. The first case component 21 includes the first axis direction-case wall 21c and a first radially directed case wall 21d constituting the left side of the circumferential direction-case wall 23. The second case component 22 includes a second axis direction-case wall 22c and a second circumferential direction-case wall 22d constituting the right side of the radially case wall 23.

The crankshaft 12, driven to rotate by a rider, and thereby receiving a drive torque, includes a main shaft 12a arranged so as to penetrate through the lower portion of the transmission case 20 in the left-right direction, and a pair of crank arms 12b which are jointed respectively to the left and right ends of the main shaft 12a protruding outwardly from the transmission case 20. The main shaft 12a is rotatably supported by the first and second case components 21 and 22 with a pair of bearings 14. In addition, a pedal 13 is rotatably mounted onto each of the crank arms 12b.

The output axle 15 is arranged in a position forward, and obliquely upward, from the main shaft 12a in a way that a centerline L2 of rotation of the output axle 15 and a centerline of swing of each of the swing arms 10 are in parallel with each other, also in parallel with the centerline L1 of rotation of the crankshaft 12. The output axle 15 is also arranged in a way that the centerline L2 of rotation of the output axle 15 and the centerline of swing of each of the swing arms 10 are within a rotation track of the crank arm 12b. The pivot axle 9 is arranged in a position virtually right above the main shaft 12a in the same way as the output axle 15. The pivot axle 9, fixed to the main frames 2, is inserted into a through hole created by bosses 21e and 22e, which are respectively formed in the first and the second case component 21 and 22 and protrude toward the internal space 24, and supports the first and second case components 21 and 22.

With reference to FIG. 4, the output axle 15, housed in the transmission case 20, includes an end part 15a protruding rightwards from the second case component 22. A drive sprocket 17 as a drive body of rotation for output is joined to the end part 15a. With reference to FIG. 1 in combination, a chain 19 as a flexible endless power transmission belt for output is wrapped around both the drive sprocket 17 and a driven sprocket 18 for output which is a driven body of rotation for output and connected to the rear wheel Wr while being driven. In addition, the drive sprocket 17, the chain 19 and the driven sprocket 18 constitute the drive-power transmitting mechanism for driving the rear wheel Wr as a drive wheel.

Hereinafter, descriptions will be further provided chiefly for the transmission system T.

With reference to FIGS. 2 to 4, the transmission system T includes, a transmission mechanism M1 using a chain, a gear shifting mechanism M2 which moves the transmission mechanism M1 to a desired gear position according to transmission operations, and a transmission case 20 for housing a derailleur 70 to be described later, which is the component constituting the transmission mechanism M1 and the gear shifting mechanism M2.

The transmission mechanism M1 includes: a one-direction clutch 30; a ball spline mechanism 31 which is a sliding mechanism; a drive sprocket 32; a plurality of transmission sprockets 41 to 47 which are driven sprockets; an endless chain C for transmission of the drive torque; and a chain guide member 50. The drive sprocket 32 is arranged so as to be coaxial with the main shaft 12a of the crankshaft 12 and connected to the crankshaft 12 via the one-direction clutch 30 and ball spline mechanisim 31 while being driven.

The one-direction clutch 30 includes: clutch inners 30a which can rotate together with the crankshaft 12; cylicndrical clutch outers 30b, each of which is arranged next to the clutch inner 30a in the radial direction; and a plurality of claws 30c as clutch components, each of which is arranged between one of the clutch inners 30a and corresponding one of the clutch outers 30b. Each of the claws 30c meshes with multiple ratchet teeth which are formed in the inner peripheries of the clutch outers 30b.

Then, the clutch outers 30b are connected to the clutch inners 30a via the claws 30c and rotate with the clutch inners 30a only when the crankshaft 12 rotates in a direction AO in which the crankshaft 12 makes the forward rotation.

Each of the ball spline mechanisms 31, arranged together with the one-direction clutch 30 in the torque transmission path provided between the crankshaft 12 and the drive sprocket 32, includes: an inner cylinder 31a which can rotate with the clutch outer sleeve 30b; an outer cylinder 31b which is arranged next to the inner cylinder 31a in the radial direction and moves together with the drive sprocket 32; and a plurality of ball bearings 31c which is arranged between the inner cylinder 31a and the outer cylinder 31b in the radial direction and connects the outer cylinder 31b to the inner cylinder 31a so that the outer cylinder 31b can rotate with the inner cylinder 31 a and move in the axis direction.

Each of the inner cylinder 31a is rotatably supported at the outer periphery of the main shaft 12a with a bearing 34 and, using a connection pin 33, connected to the clutch outer sleeve 30b so as to be rotatable with the clutch outer sleeve 30b. By using circular rings 35 and 36, constituting a pair of thrust bearings which are respectively brought in contact with, and fixed to both ends of the main shaft 12a in the axis direction so as not to be movable, the inner cylinder 31a is supported by the main shaft 12a so as not to be movable in the axis direction. While one ring, the ring 35, is allowed to abut a collar 38, which abuts a snap ring 37 which fits into circular grooves provided in the main shaft 12a, the other ring, the ring 36, is allowed to abut the clutch inner 30a. In that way their movement in the axis direction is limited. Meanwhile, the drive sprocket 32 is integrally connected to the outer cylinder 31b using rivets.

On the outer surface of the inner cylinder 31a, a plurality of guide grooves 31a1, three in this embodiment, are formed at regular intervals in the circumferential direction in such a way that they extend along the axis direction. The guide groove 31a1 serves to house and support the ball bearings 31 c so as to be rollable, and guide them in a way that they cannot move in the circumferential direction while permitting them to move in the axis direction. Moreover, the inner surface of the outer cylinder 31b is provided with as many guide grooves 31b1 as the guide grooves 31a1 at given intervals in the circumferential direction, so that they face the guide grooves 31a1 in the radial direction and extend along the axis direction. Like the guide grooves 31a1, each of the guide grooves 31b1 serves to house and support the ball bearings 31c so as to be rollable, and guide them in a way that they cannot move in the circumferential direction and that they can move in the axis direction. A ball line constituted of the plurality of ball bearings 31c is housed between the pair of guide grooves 31a1 and 31b1, respectively constituted of the guide groove 31a1 formed in the inner cylinder 31a and the guide groove 31b1 formed in the outer cylinder 31b which face each other in the radial direction.

Accordingly, the outer cylinder 31b and the drive sprocket 32 can rotate together with the crankshaft 12 and the inner cylinder 31a which cannot move in the axis direction, and can move in the axis direction with the ball bearings 31c interposed therebetween. Then, the one-direction clutch 30 transmits only the forward rotation of the crankshaft 12, or torque generated as a result of this rotation, to the drive sprocket 32 via the ball spline mechanism 31.

With reference to FIGS. 2 and 4, the output axle 15 is rotatably supported by the transmission case 20 using a pair of bearings 39 held respectively by the case component 21 and 22, and a sprocket cluster 40 is constituted of a plurality of sprockets which are different from one another in outer diameter (in other words, diameter of an addendum circle of a sprocket) and in number of teeth. In this embodiment, the sprocket cluster 40 is constituted of 7 transmission sprockets 41 to 47. The sprocket cluster thus constituted is joined with the output axle 15 using splines in a way such that the sprocket cluster 40 rotates together with the output axle 15 and that the sprocket cluster 40 is arranged coaxially with the output axle 15. For this reason, a centerline L3 of rotation of the transmission sprockets 41 to 47 is coincident with a centerline L2 of rotation of the output axle 15, which is in parallel with the centerline L1 of rotation of the crankshaft 12. Toward the second case component 22, the transmission sprockets 41 to 47 are arranged in the axis direction in order from the transmission sprocket 41 for the first-speed as the minimum speed, sequentially to the transmission sprocket 47 for the seventh-speed as the maximum speed.

With reference to FIG. 3 in combination, the chain C is wrapped around the drive sprocket 32 and an operation sprocket. The operation sprocket is the one of the transmission sprockets 41 to 47 selected out of the sprocket cluster 40 by use of the gear shifting mechanism M2 (hereinafter, referred to simply as an "operation sprocket." In FIGS. 2 to 4 either the sprocket 41 or the sprocket 47 is selected as the operation sprocket). The output axle 15 is then driven and rotated by the crankshaft 12 at a gear ratio determined by the drive sprocket 32 and the operation sprocket which is connected to the drive sprocket 32 through the chain C while being driven.

The chain guiding member 50 is provided for the chain C which is driven by the forward rotation of the crankshaft 12, and arranged in a position where the chain C is pulled tight. The chain guiding member 50 constitutes a means for preventing the slack chain C from getting stuck between the drive sprocket 32 and the transmission case 20 when a decrease in the tension on the chain causes slack in the chain C at positions where it is pulled tight.

With reference to FIG. 2, the chain guiding member 50 includes a guide part 51 and a prevention part 53. The guide part 51 forms an opening 52 having a width slightly larger than that of the sprocket cluster 40 in its axis direction. The prevention part 53 prevents the chain C, pulled out from one of the transmission sprockets 41 to 47, from moving towards the inside of the orbit of the chain C. For the slack chain C to be pulled tight and guided in the opening 52, the guide part 51 includes an inner guide part 51a and an outer guide part 51b. The inner guide part 51a is arranged in a position toward the inside of the orbit of the chain from the opening 52, and the outer guide part 51b is arranged in a position toward the outside of the orbit of the chain from the opening 52 and has a outer guide part 51b1 and a roller 51b2.

With reference to FIGS. 1 to 4, the gear shifting mechanism M2 includes a transmission operation mechanism 60 and the derailleur 70. The derailleur 70 is a changing mechanism for changing the chain C from one transmission sprocket to another among the sprocket cluster 40 in response to a transmission operation through the transmission operation mechanism 60. The chain C is wrapped around the drive sprocket 32, the operation sprocket, a guide pulley 72 and a tension pulley 82, which will be described later. The guide pulley 72 and the tension pulley 82 are both arranged in a slack portion of the chain C that is driven by the forward rotation of the crankshaft 12.

The transmission operation mechanism 60, connected to the derailleur 70 in the internal space 24 of the transmission case 20, includes a transmission operation member 61 (see FIG. 1) and an operation cable 62. The transmission operation member 61 is constituted of a transmission lever and the like, which are operated by a rider. The operation cable 62 is an operation member for operationally connecting the transmission operation member 61 with the derailleur 70 in order to transfer the operation force which has worked on the transmission operation member 61 to the derailleur 70. The operation cable 62 is constituted of an outer cable 62a and an inner cable 62b. The outer cable 62a has a tubular shape and is held by the bicycle frame F and the transmission case 20. The inner cable 62b is inserted inside the outer cable 62a so as to be movable. The derailleur 70 side-end of the inner cable 62b is constituted of an engaging part 62b1 to be described later.

Figure 5:
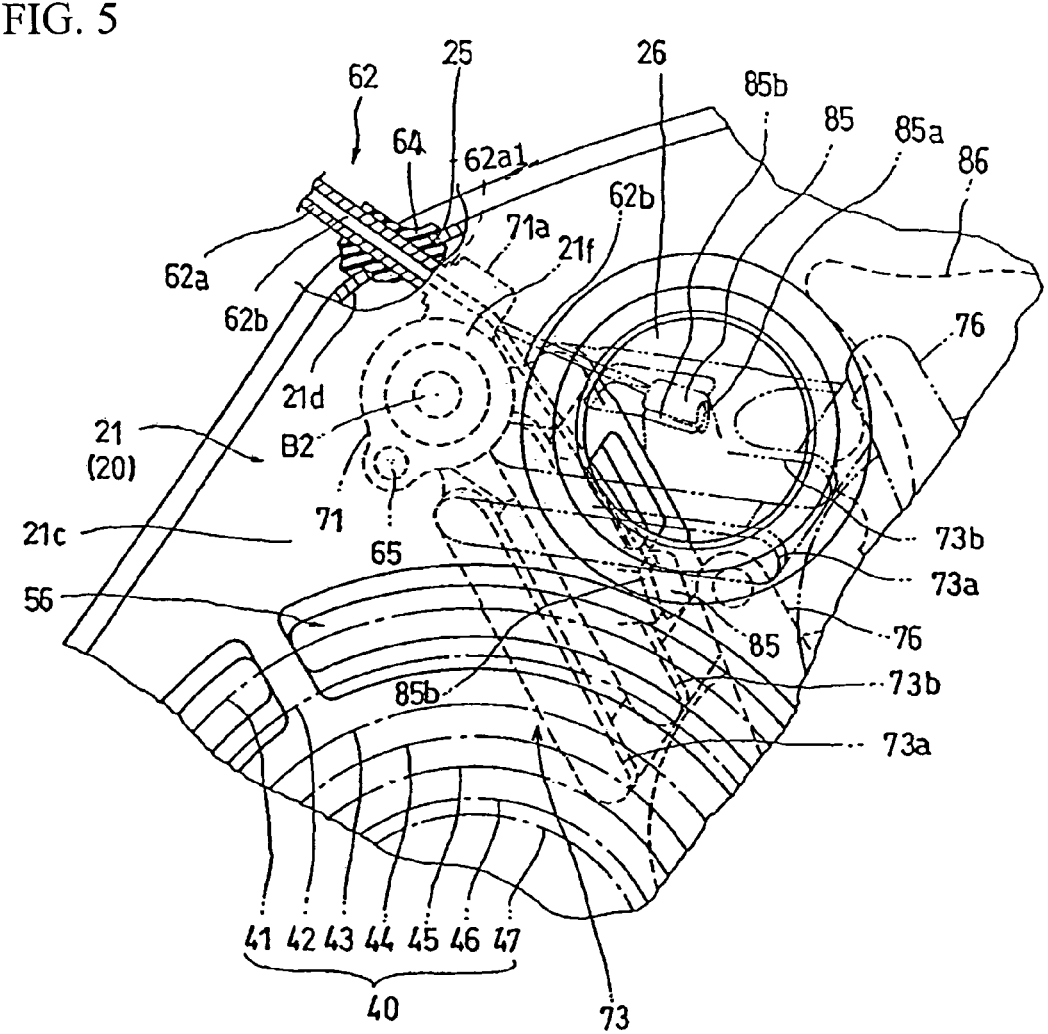
FIG. 5 is a side detail view, partially cut away and seen in the direction of arrow V of FIG. 3, showing the position of the work opening with respect to the linking part and distal end of the operating cable, the work opening shown without a cap.

With reference to FIGS. 2, 3 and 5, the operation cable 62 extends, over a swinging range to be described later, from the internal space 24 of the transmission case 20 to the outside through an operation opening 25. This operation opening 25 is a through hole formed in the radially directed case wall 23, and faces a later-described linking part 85 in the radial direction or in the orthogonal direction to the axis direction. To be more specific, the operation cable 62 runs through the through hole formed in a grommet 64 which is fitted into and held by the opening 25 provided in the first circumferential direction case wall 21d of the first case component 21. An end 62a1 of the outer cable 62a, a derailleur 70-side end, is held by a holding part 71a of the derailleur 70 and is detachably held. Further, the transmission operation member 61-side end of the inner cable 62b that is extending from the end 62a in the internal space 24 of the transmission case 20 is connected to the transmission operation member 61. Then, at an engaging part 62b1 of the inner cable 62b, the derailleur 70-side end, the inner cable 62b is connected to a parallelogram link mechanism 73.

With reference to FIGS. 2 to 4, the derailleur 70 is arranged above the main shaft 12a of the crankshaft 12 and, upon operation of the operation cable 62, changes the chain C, wrapped around the drive sprocket 32, from one transmission sprocket to another among the transmission sprockets 41 to 47. The derailleur 70 includes a cylindrical base part 71, the guide pulley 72, a holder H, the parallelogram link mechanism 73 and a tensioner 74. The base part 71 is fixed to, and held by the two case components 21 and 22, and includes the integrally-molded holding part 71a for the outer cable 62a. The guide pulley 72 is a guide member for guiding the chain C in a way that it is wrapped around an operation sprocket, the sprocket upon which the chain C will ride, when the chain C is intended to be changed among the transmission sprockets 41 to 47. The holder H rotatably supports the guide pulley 72. The parallelogram link mechanism 73 links the base part 71 and the holder H together, and has a pair of links 73a and 73b. The pair of links 73a and 73b are an operation mechanism for moving the holder H and the guide pulley 72 both in the axis direction and in the radial direction of the centerline L3 of rotation in response to a transmission operation through the transmission operation mechanism 60. The tensioner 74 imparts a tension force to the chain C.

Figure 6:
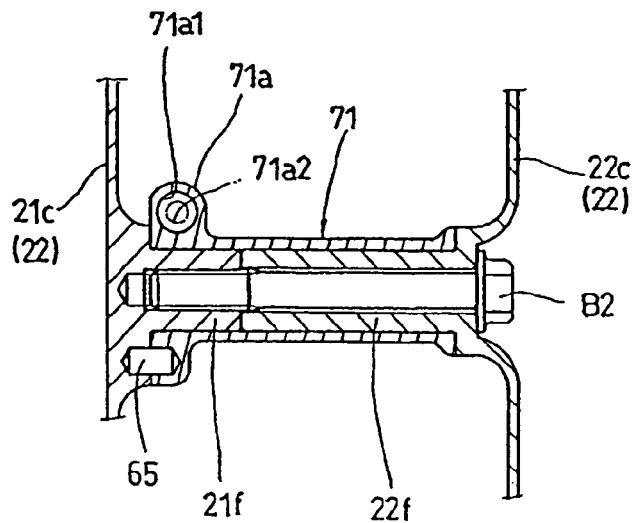
FIG. 6 is an isolated cross-sectional view taken along the VI-VI line in FIG. 3, showing the configuration of the holding part with respect to the transmission case.

With reference to FIG. 6 in combination, the base part 71 is fitted to the outside of a pair of boss parts 21f and 22f, which are respectively formed in the first and second case components 21 and 22 and protrude in the axis direction to face each other. By use of a rotation-preventing pin 65, provided between the first case component 21 and the base part 71, and a bolt B2 which is inserted into the boss part 22f and further screwed into the boss part 21f, the base part 71 is fixed to the transmission case 20 in such a way that it cannot rotate and cannot move in the axis direction. The holding part 71a is located on the base part 71 at a position closer to the first case component 21, or located at a position closer to a second limit position to be described later. The holding part 71a is a cylindrical portion with a bottom, which is integrally molded with the base part 71 in a protruding manner. The holding part 71a is provided with a large diameter hole 71a1 in which the end 62a1 of the outer cable 62a is housed, and a small diameter hole 71a2 through which the inner cable 62b passes.

The holder H is constituted of first and second holders 76 and 77 which are linked together with a pair of rivets 75a and 75b, and a supporting part 78. The guide pulley 72 is rotatably supported by the first and second holders 76 and 77 by means of the supporting part 78 which includes a collar 78a fixed to the outside of the rivet 75a and a bearing 78b rotatably supported by the collar 78a. A pair of first and second arms 86 and 87, which will be described later, is integrally press-fitted into an inner 78b1 of the bearing 78b.

With reference to FIGS. 2 to 4, the second holder 77 includes a connecting part 79 and a spring housing part 80. The pair of links 73a and 73b as the member to be operated, is pivotally attached and connected to the connecting part 79. The spring housing part 80 houses tension springs 83. In the parallelogram link mechanism 73, the links 73a and 73b are pivotally attached to the base part 71 with a pair of pins 81a and 81b that are provided to be in parallel with each other. The links 73a and 73b are also pivotally attached to a pair of pins 82a and 82b that are provided in the connecting part 79 of the second holder 77 to be in parallel with the pair of pins 81a and 81b. Moreover, a return spring constituted of tension coil springs (not shown) is provided to bridge between the pins 81a and 82b.

Furthermore, the tensioner 74 includes: a tension pulley 82 which imparts a tension force to the chain C by pressing it between the drive sprocket 32 and the guide pulley 72; first and second arms 86 and 87 which are disposed between the first and second holders 76 and 77 to sandwich the guide pulley 72 in the axis direction and rotationally support the tension pulley 82; and a tension spring 83 constituted of springs 83a and 83b, each of which is made of two return coil springs respectively with different diameters. With their respective spring forces, the springs 83a and 83b energize the tension pulley 82 clockwise about the centerline L4 of rotation in FIG. 2, thereby pressing the tension pulley 82 against the chain C.

Figure 7:
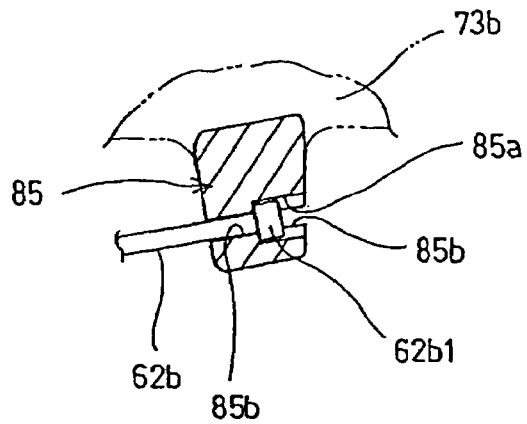
FIG. 7 is an isolated cross-sectional view of the derailleur seen in the direction of arrow V of FIG. 3, and cut along a plane orthogonal to the swing center of the derailleur.

With reference to FIGS. 3, 5 and 7, the link 73a of the parallelogram link mechanism 73 has the integrally-molded linking part 85 to which the inner cable 62 is detachably connected. The linking part 85 is constituted of a protruding part which protrudes from the link 73a to a later-described work opening 26 in the axis direction. The linking part 85 is provided with a fit hole 85a with a bottom for housing the engaging part 62b1 of the inner cable 62b which is held by the linking part 85, and a slit 85b which opens up toward the fit hole 85a and opens in the outer surface of the linking part 85. The slit 85b is slightly larger than the outer diameter of the inner cable 62b except for the engaging part 62b1 and is smaller in width than the engaging part 62b1. The inner cable 62 is inserted into the fit hole 85a by passing through the slit 85b, pulled to allow the engaging part 62b1 to be detachably fitted into the fit hole 85a, held by the linking part 85 and linked to the linking part 85.

When the operation cable 62 needs to be replaced, the inner cable 62b is unlinked from the linking part 85 and pulled out of the transmission case 20 in such a manner that it first passes through the hole 71a2 formed in the holding part 71a and, together with the outer cable 62a, passes through the hole 71a1 formed in the holding part 71a and the through hole formed in the grommet 64. Then a new operation cable 62 is allowed to pass through the grommet 64, and a new outer cable 62a is held by the holding part 71. Thereafter, a new inner cable 62b passing through the holding part 71a is linked to the linking part 85.

Prior to an operation force from the transmission operation member 61 working on the inner cable 62b linked to the linking part 85, the parallelogram link mechanism 73 is located, for example, at the standard gear position or the maximum-speed gear position that are indicated by the straight lines or the dashed lines in FIGS. 2, 3 and 5. Then, again for example, the transmission sprocket 47 is selected as an operation sprocket. When the transmission operation member 61 is operated and the operation force according to the gear position has worked on the inner cable 62b, the parallelogram link mechanism 73 swings about the pins 81a and 81b and moves the guide pulley 72 along the addendum circle group, which is composed of the addendum circles of the transmission sprockets 41 to 47. At this time, the links 73a and 73b, the holders 76 and 77, the arms 86 and 87 and the tension pulley 82 swing together with the guide pulley 72, and move in the axis and radial directions toward the operation sprocket, which is a transmission sprocket upon which the chain C will ride. At the same time, the chain C moves in the axis direction toward the transmission sprocket upon which the chain C will ride. When they are located at the minimum-speed gear position indicated by the chain double-dashed lines in FIGS. 2, 3 and 5, the transmission sprocket 41 is selected as the operation sprocket.

For this reason, the derailleur 70, that is, the links 73a and 73b, the holders 76 and 77, the guide pulley 72, the arms 86 and 87 and the tension pulley 82 can move within a swing range when they are operated by the transmission operation mechanism 60. The swing range is a moving range that is specified by the first limit position as the maximum-speed gear position and the second limit position as the minimum-speed gear position (hereinafter simply referred to as "swing range")

With reference to FIGS. 2, 3 and 5, the transmission case 20 is provided with the work opening 26, which is a through hole through which the derailleur 70 housed in the transmission case 20 may be manually accessed to link/unlink the inner cable 62b to/from the linking part 85 of the parallelogram link mechanism 73 by operating it from outside the transmission case 20. A female thread portion is formed on the wall surface around the round hole-shaped opening 26. A synthetic resin cap 27 having a male thread portion which cooperatively engages the female thread portion covers the opening 26. Thus, the opening 26 is plugged and enclosed. It will be understood from a review and comparison of FIGS. 2, 3 and 5 that the cap 25 is configured and arranged to be removable from the transmission case 20 without requiring removal of any other component.

The opening 26 is provided in the first axially directed case wall 21c, which is a wall of the transmission case 20 and is located at the position closest in the axis direction to the transmission sprocket 41, which has the largest outer diameter among the sprocket cluster 40. In addition, the opening 26 is arranged above the transmission sprocket 41. In the sprocket cluster 40, the transmission sprocket 41 is located at the position closest to the opening 26 in the radial direction. The opening 26 is formed in a position that corresponds to the vicinity of a later-described prevention part 56 in the radial direction and where the derailleur 70 does not interfere with the prevention part 56, so that the larger part of the linking part 85 can be seen and/or accessed through the opening 26 when viewed from the side.

With reference to FIG. 5, when viewed from the side, the opening 26 is located in a position that makes it seem to overlap with the linking part 85 over at least half of the swing range. In this embodiment the linking part 85 is placed in the vicinity of the opening 26 when the parallelogram link mechanism 73 is located at the first limit position. However, when the parallelogram link mechanism 73 is located at the first limit position, the linking part 85 is located at a position where it cannot be seen through the opening 26 when viewed from the side. As the parallelogram link mechanism 73 swings and moves toward the second limit position, the linking part 85 moves to a position where it can be seen through the opening 26 when viewed from the side. When the parallelogram link mechanism 73 is in the second limit position, the linking part 85 is in a position where the whole of the linking part 85 can be seen through the opening 26 when viewed from the side, as indicated by the chain double-dashed line in FIG. 5.

Furthermore, as shown in FIG. 3, the distance in the axis direction between the opening 26 and the linking part 85 varies depending on what gear the transmission is in. To be more specific, when the parallelogram link mechanism 73 is located at the first limit position, the link 73b and the linking part 85 are in positions farthest from the opening 26 in the axis direction over the swing range, and as the parallelogram link mechanism 73 swings and moves toward the second limit position, they are caused to get close to the opening 26 in the axis direction. As indicated by the chain double-dashed line in FIG. 3, the axis direction-tip end of the linking part 85 then enters inside the opening 26 when the parallelogram link mechanism 73 is in the second limit position. Thus, the linking part 85 is caused to get closer to the opening 26 in the axis direction in any of the following cases: the transmission sprocket 41 is selected as an operation sprocket; the linking part 85 is in positions closer to the transmission sprocket 41 in the axis direction; and among the sprocket cluster 40 a sprocket with a larger outer diameter is selected as an operation sprocket upon which the chain C will ride.

With reference to FIGS. 2 and 4, the first axially directed case wall 21c is further provided with a prevention part 56 with the following feature. When the chain C is intended to be moved to the transmission sprocket 41 located closest to the transmission case 20 in the axis direction, the prevention part 56 comes in contact with the chain C at a location in which it is about to move beyond the transmission sprocket 41 in the axis direction. Thus the prevention part 56 prevents the chain C from moving beyond the transmission sprocket 41 and moving toward the first axially directed case wall 21c. The prevention part 56 is constituted of a protruding part, which is formed in the internal space 24 by subjecting a portion of the first axis diameter-case wall 21 to a bending process and allowing it to have an arc shape when viewed from the side. Here, the portion, when viewed from the side, corresponds to the portion C1 of the transmission sprocket 41 upon which the chain C is wrapped (see FIG. 2). When the chain C is moved in the axis direction toward the transmission sprocket 41 upon operation of the derailleur 70, this prevention part 56 can achieve secure engagement between the chain C and the transmission sprocket 41 with a simple configuration.

Next, functions and effects of the embodiment configured as described above will be described.

In a case where a rider drives the crankshaft 12 in the forward rotational direction A0 or where the bicycle B moves forward while the rotation of the crankshaft 12 is stopped or the crankshaft 12 is rotated backward, the operation of transmission operation member 61 moves the first and second holders 76 and 77, the guide pulley 72, the first and second arms 86 and 87 and the tension pulley 82, which are components of the derailleur 70, to the maximum-speed gear position (here, seventh-speed gear) which is indicated by the solid lines in FIGS. 2 to 4, the transmission sprocket 47 having the smallest outer diameter is selected as the operation sprocket among the sprocket cluster 40 and the chain C is wrapped around the drive sprocket 32 and the transmission sprocket 47 that are indicated by the solid lines in FIGS. 3 and 4. Through the one-direction clutch 30 and the ball spline mechanism 31, the forward rotation of the crankshaft 12 drives the drive sprocket 32 to rotate. Through the chain C, the drive sprocket 32 then drives the transmission sprocket 47, the output axle 15 and the drive sprocket 17 to rotate at the gear ratio determined by the sprockets 32 and 47. The drive sprocket 17 then drives the driven sprocket 18 and the rear wheel Wr to rotate through the chain 19.

When the transmission operation member 61 is operated in such a way as to select, as an operation sprocket, a lower-speed transmission sprocket (e.g., the transmission sprocket 41) among the transmission sprockets 41 to 46 for the purpose of changing the gear position from this maximum-speed gear position, the inner cable 62b operates the parallelogram link mechanism 73 of the derailleur 70. Thus, the parallelogram link mechanism 73 causes the first and second holders 76 and 77, the guide pulley 72, the first and second arms 86 and 87 and the tension pulley 82 to move leftwards in the axis direction and outwards in the radial direction from the centerline L3 of rotation. In this way they are moved to the low-speed gear position (here, first-speed gear) as indicated by the chain double-dashed lines in FIGS. 2 to 4. The chain C which moves leftwards along with the guide pulley 72 and the tension pulley 82 causes the drive sprocket 32 to move leftwards in the axis direction together with the main shaft 12a of the crankshaft 12. Accordingly, the drive sprocket 32 is in a position as indicated by the chain double-dashed lines in FIGS. 3 and 4. At this time, the chain C is wrapped around the tranmission sprocket 41 and thereby the transmission sprocket 41 is connected to the drive sprocket 32 through the chain C while being driven.

Additionally, when the transmission operation member 61 is operated in such a way as to select, among the sprockets 42 to 47, one transmission sprocket located in the gear position that can produce higher speed than the first gear position, the inner cable 62b operates the parallelogram link mechanism 73 of the derailleur 70. Accordingly, the parallelogram link mechanism 73 causes the first and second holders 76 and 77, the guide pulley 72, the first and second arms 86 and 87 and the tension pulley 82 to move rightwards in the axis direction and inwards in the radial direction to the centerline L3 of rotation. The chain C moving rightwards together with the guide pulley 72 and the tension pulley 82 causes the drive sprocket 32 to move rightwards along the main shaft 12a. Concurrently, the chain C is wrapped around a transmission sprocket which has been selected out of the transmission sprockets 42 to 47.

In this manner, the derailleur 70 which is operated in response to the transmission operation through the transmission operation mechanism 60 changes the chain C from one transmission sprocket to another among the transmission sprockets 41 to 47. Thus, the bicycle B runs with a gear ratio that is determined by the selected operation sprocket and the drive sprocket 32, both of which the chain C is wrapped around.

In the transmission system T that includes the sprocket cluster 40 and the transmission case 20 for housing the derailleur 70 and the chain C, the transmission case 20 is provided with the work opening 26 through which the inner cable 62b of the operation cable 62 and the linking part 85 of the derailleur 70 are accessible so as to be manually linked/unlinked from one another. The opening 26 is formed in the first axis direction-case wall 21c which is located closest in the axis direction to the transmission sprocket 41 having the largest outer diameter among the sprocket cluster 40. Among the sprocket cluster 40, the transmission sprocket 41 is located closest in the axial direction to the opening 26. Thus, when the chain C is wrapped around the transmission sprocket 41, the distance in the axis direction between the opening 26 and the chain C is smaller than the distance between the chain C and each of the transmission sprockets 42 to 46 in the sprocket cluster 40.

In addition, the transmission sprocket 41 is located closest in the radial direction to the opening 26. For this reason, oil lubrication can be easily provided to the chain C through the opening 26, eliminating the need of enlarging the opening 26 for oil lubrication. Thus, it is possible to minimize the size of the opening 26 and thus to prevent and inhibit a reduction in the rigidity of the transmission case 20 due to the presence of the opening 26 while ensuring easy oil lubrication of the chain C and a required rigidity. Thus, it is also possible to avoid the necessity for enlarging the transmission case 20 and to prevent an increase in weight while ensuring a required rigidity.

Because the opening 26 is located above the transmission sprocket 41, the chain C, wrapped around the sprocket 41, can be efficiently lubricated through the opening 26. In addition, as shown in FIG. 2, if the chain C is wrapped around the transmission sprocket 41 that has the smallest outer diameter among the sprocket cluster 40, the chain C on the tension pulley 82 gets close to the opening 26. For this reason, the chain C can be easily lubricated using, for example, spray oil.

The operation cable 62 extends inside and outside of the internal space 24 of the transmission case 20 while passing through the operation opening 25 formed in the transmission case 20. The operation opening 25 is formed in the first circumferential direction-case wall 21d that faces the linking part 85 in the axis direction. Thus, in the transmission case 20, the operation opening 25 cannot be formed in the first axially directed case wall 21c in which the work opening 26 is formed, thereby lowering the restriction on the formation of the opening 26 in the first axially directed case wall 21c. As a result, increased flexibility can be achieved in the selection of region in the first axis direction-case wall 21c where the opening 26 can be formed. Thus, the opening 26 can be formed in a region which is appropriate for accessing the link mechanism 73 in order to permit inking/unlinking the inner cable 62b to/from the linking part 85 as well as lubricating the chain C, facilitating link/unlink operation and lubrication operation.

The derailleur 70 is provided with the links 73a and 73b that, when changing the chain C from one transmission sprocket to another, move the chain C in the axis direction toward the transmission sprocket upon which the chain C will ride. The link 73b is provided with the linking part 85 which protrudes from the link 73b to the opening 26 in the axis direction and thereby the linking part 85 gets closer to the opening 26 in the axis direction. Thus, the inner cable 62b and the linking part 85 can be linked/unlinked more easily.

In a case where either the transmission sprocket 41 or any transmission sprocket that is located closer to the transmission sprocket 41 in the axis direction is selected as the transmission sprocket upon which the derailleur 70 moves the chain C, the linking part 85 gets closer to the opening 26 in the axis direction. Accordingly, it is possible to bring the linking part 85 close to the opening 26 in the axis direction by operating the derailleur 70 to allow the chain C to be wrapped around, among the sprocket cluster 40, any transmission sprocket that is located closer in the axis direction to the transmission sprocket 41, preferably by operating the derailleur 70 to allow the chain C to be wrapped around the transmission sprocket 41 itself Thus, when performing the lubrication operation, the connecting condition between the inner cable 62b and the linking part 85 can be checked easily.

Moreover, when viewed from the side, the opening 26 is located in a position that makes it seem to overlap with the linking part 85 over at least half of the swing range. Over the entire swing range, the linking part 85 is in a position where it can be seen through the opening 26 when viewed from the side. Thus, the inner cable 62b and the linking part 85 can be linked/unlinked more easily within a range in which the opening 26 and the linking part 85 face each other in the axis direction.

Hereinafter, with regard to an embodiment in which a part of the configuration of the above-described embodiment is modified, a description will be provided for the modified configuration.

Figure 8:
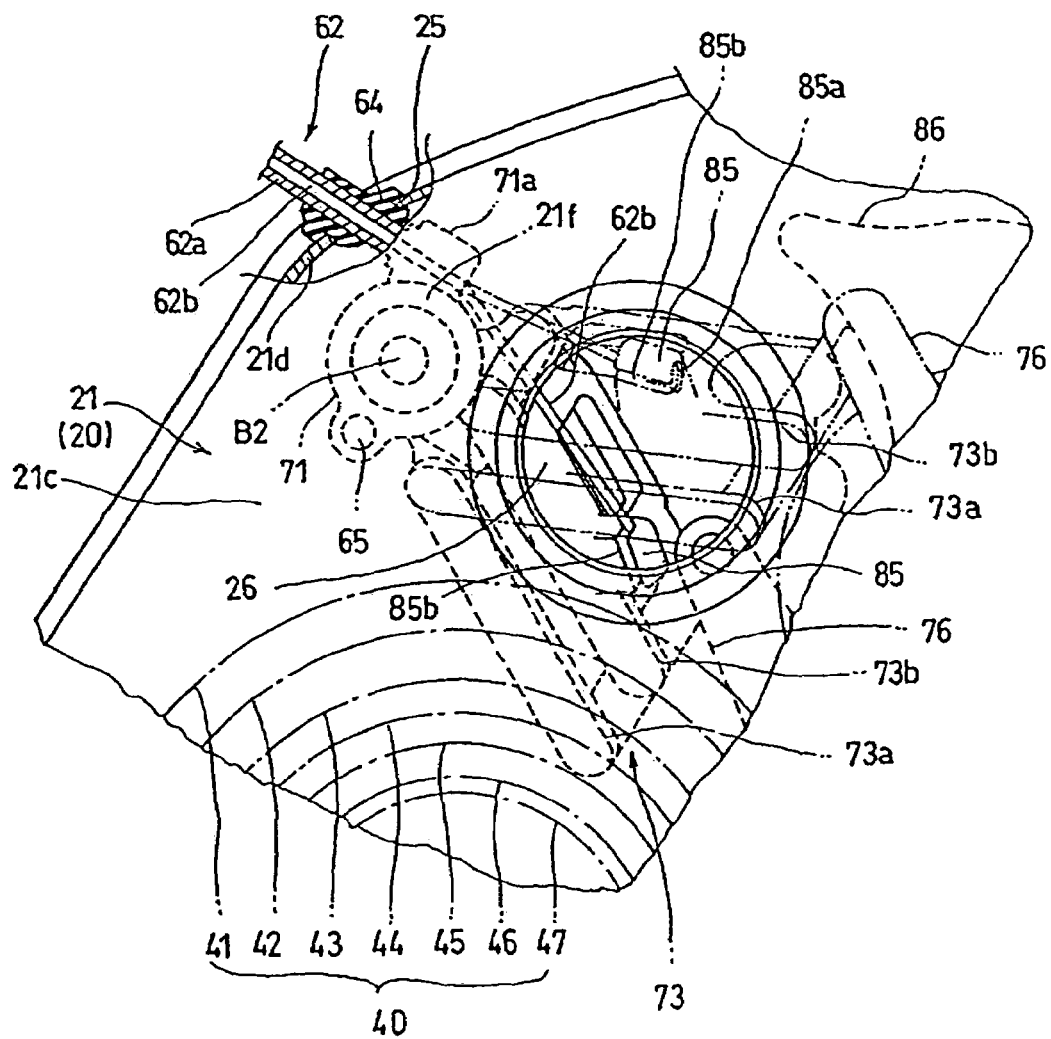
FIG. 8 shows another embodiment of the present invention, and is a side view showing an alternative position of the work opening with respect to the linking part and distal end of the operating cable, the work opening shown without a cap.

As shown in FIG. 8, when the prevention part 56 is not provided on the first case component 21, the opening 26 can be provided in a position that makes it seem overlap with the linking part 85 when viewed from the side over the entire range in which the parallelogram link mechanism 73 swings and that is located closest in the radial direction to the transmission sprocket 41 with the largest outer diameter. In this case, when the parallelogram link mechanism 73 is in the first limit position (indicated by the straight line or dotted line in FIG. 8), the linking part 85 is in a position where it can be seen through the opening 26 when viewed from the side. Moreover, the linking part 85 can be seen through the opening 26, when viewed from the side, over the entire swing range in which the parallelogram link mechanism 73 moves from the first limit position to the second limit position (indicated by the chain double-dashed line in FIG. 8).

When viewed from the side, the linking part 85 is in a position where it can be seen through the opening 26 over the entire swing range as described above. Thus, the entire swing range is regarded as the aforementioned range in which opening 26 and the linking part 85 face each other in the axis direction. For this reason, the inner cable 62b and the linking part 85 can be linked/unlinked through the opening 26 more easily than in the aforementioned embodiment where a part of the swing range is regarded as the aforementioned range in which the opening 26 and the linking part 85 face each other in the axis direction. In addition, even when the parallelogram link mechanism 73 is in the first limit position, the linking part 85 is in a position where it can be seen through the opening 26 when viewed from the front, which means that the opening 26 is located closer in the radial direction to the transmission sprocket 41 than in the aforementioned embodiment where the linking part 85 can never be seen through the opening 26 when the parallelogram link mechanism 73 is in the first limit position. Accordingly, lubrication for the chain C through the opening 26 can be performed more easily.

The opening 25 is formed in the first case component 21. However, it may be formed in the second radially directed case wall 22d of the second case component 22. The aforementioned swing mechanism may be other than the parallelogram link mechanism. The transmission system T may be provided for machines other than bicycles.

While a working example of the present invention has been described above, the present invention is not limited to the working example described above, but various design alterations may be carried out without departing from the present invention as set forth in the claims.

What is claimed is,

1. A transmission system, comprising:
   a chain;
   a sprocket cluster comprising a plurality of transmission sprockets having different outer diameters, the sprockets of the sprocket cluster being arranged along a common sprocket axis;
   a changing mechanism and an operation cable for use in operating the changing mechanism,
   the changing mechanism being detachably linked to the operation cable, the changing mechanism being operable to move the chain in an axial direction of the sprocket cluster such that the chain moves from one transmission sprocket to another among the sprocket cluster in response to movement of the operation cable,
   the changing mechanism comprising a linking part which detachably links the operation cable to the changing mechanism; and
   a transmission case for housing the sprocket cluster, the changing mechanism and the chain, the transmission case comprising an axially-directed case wall having a work opening formed therein, and a radially-directed case wall having an operation opening formed therein through which an end portion of the operation cable extends;
   wherein the operation cable and the linking part of the changing mechanism may be accessed via the work opening in the axially-directed case wall of the transmission case component to permit connection or disconnection of the operation cable, and wherein the chain may be lubricated via the work opening;
   wherein the work opening is located closest in the sprocket axis direction to a transmission sprocket having the largest outer diameter among the sprocket cluster, and
   wherein the transmission sprocket having the largest outer diameter, within the sprocket cluster, is also located closest to the work opening in a direction radial to the sprocket axis.

2. The transmission system according to claim 1, wherein the changing mechanism includes an operation member which is operable to move the chain in the axis direction toward a target sprocket, upon which the chain will ride, when shifting the chain from one transmission sprocket to another, and wherein the linking part is provided on the operation member and protrudes from the operation member in the sprocket axis direction toward the work opening.

3. The transmission system according to claim 1, wherein the linking part gets closer to the work opening in the sprocket axis direction in a case where the largest diameter transmission sprocket, or any transmission sprocket between the largest diameter transmission sprocket and the currently selected sprocket, is selected as a target sprocket towards which the changing mechanism moves the chain.

4. The transmission system according to claim 1, wherein the work opening is positioned above the largest diameter transmission sprocket, and is spaced apart from the outer periphery of the largest diameter transmission sprocket when viewed in the sprocket axis direction.

5. The transmission system according to claim 1, wherein the work opening is positioned above the largest diameter transmission sprocket, and is closely adjacent to the outer periphery of the largest diameter transmission sprocket when viewed in the sprocket axis direction.

6. The transmission system according to claim 1, further comprising a cap which is detachably secured over the work opening to plug and protectively cover the work opening, wherein the cap is configured and arranged to be removable from the transmission case without requiring removal of any other component.

7. The transmission system according to claim 6, wherein the cap is detachably secured to the transmission case via cooperatively engaging threaded portions provided on the cap and the periphery of the work opening, respectively.

8. The transmission system according to claim 1,
   wherein the changing mechanism includes an operation member which is operable to move the chain in the axis direction toward a target sprocket, upon which the chain will ride, when shifting the chain from one transmission sprocket to another, the linking part is provided on the operation member and protrudes from the operation member in the sprocket axis direction toward the work opening, the changing mechanism being operable through a swing range having a first limit position corresponding to placement of the chain on the smallest diameter transmission sprocket, and having a second limit position corresponding to placement of the chain on the largest diameter transmission sprocket, and wherein the work opening is located on the transmission case in a position in which it overlaps with the linking part over at least half the swing range, when viewed in the sprocket axis direction.

9. The transmission system according to claim 1, wherein the changing mechanism includes an operation member which is operable to move the chain in the axis direction toward a target sprocket, upon which the chain will ride, when shifting the chain from one transmission sprocket to another, wherein the linking part is provided on the operation member and protrudes from the operation member in the sprocket axis direction toward the work opening, wherein the changing mechanism acts through a swing range having a first limit position corresponding to placement of the chain on the smallest diameter transmission sprocket, and having a second limit corresponding to placement of the chain on the largest diameter transmission sprocket, and wherein the work opening is located on the transmission case in a position in which it overlaps with the linking part over the entire swing range when viewed in the sprocket axis direction.

10. A transmission system comprising:

a chain;

a sprocket cluster comprising a plurality of transmission sprockets with different outer diameters, the sprocket cluster arranged along a sprocket axis common to each of the plural transmission sprockets;

an operation cable;

a changing mechanism detachably linked to the operation cable, the changing mechanism operable to shift the chain in an axial direction of the sprocket cluster such that the chain moves from one transmission sprocket to another among the sprocket cluster in response to selected movement of the operation cable, the changing mechanism comprising a linking part which permits detachable linking of the operation cable to the changing mechanism; and a transmission case for housing the sprocket cluster, the changing mechanism and the chain, the transmission case comprising an axially-directed case wall having a work opening formed therein, and a radially-directed case wall having an operation opening formed therein through which an end portion of the operation cable extends;

wherein the operation cable and the linking part of the changing mechanism may be accessed via the work opening in the axially-directed case wall of the transmission case component to permit connection or disconnection of the operation cable, and wherein the chain may be lubricated via the work opening, wherein the work opening is situated adjacent to a transmission sprocket having the largest outer diameter among the sprocket cluster, the work opening positioned so as to lie above and outside the outer periphery of the transmission sprocket having the largest outer diameter among the sprocket cluster, and wherein, among the sprocket cluster, the transmission sprocket having the largest outer diameter is located closest to the work opening in a direction radial to the sprocket axis.

11. The transmission system according to claim 10, wherein the operation cable extends within both the inside and the outside of the transmission case while passing through an operation opening formed in the transmission case, and wherein the operation opening is formed in a radially-directed case wall which faces the linking part in the direction radial to the sprocket axis.

12. The transmission system according to claim 10, wherein the changing mechanism includes an operation member which moves the chain in the axis direction toward a target sprocket, upon which the chain will ride, when shifting the chain from one transmission sprocket to another, and wherein the linking part is provided on the operation member and protrudes from the operation member in the sprocket axis direction toward the work opening.

13. The transmission system according to claim 10, wherein the linking part gets closer to the work opening, in the sprocket axis direction, when either the largest diameter transmission sprocket, or any transmission sprocket situated between the currently operative transmission sprocket and the largest diameter transmission sprocket is selected as a target sprocket upon which the changing mechanism moves the chain.

14. A bicycle, comprising a frame and the transmission system of claim 1 attached to the frame.

15. A bicycle, comprising a frame and the transmission system of claim 10 attached to the frame.

16. The transmission system of claim 1, wherein the operation cable includes an outer cable and an inner cable which is slidably movable relative to the outer cable;

and wherein the changing mechanism includes a derailleur assembly comprising a base part and a holding part which is integrally molded with the base part in a protruding manner for receiving an end portion of the operation cable, the holding part provided with a hole formed therein for receiving and holding an end portion of the outer cable.

17. The transmission system of claim 16, wherein the derailleur assembly further comprises a link, and wherein the linking part is provided on, and protrudes from said link in the sprocket axis direction toward the work opening.

18. The transmission system of claim 10, wherein the operation cable includes an outer cable and an inner cable which is slidably movable relative to the outer cable;

and wherein the changing mechanism includes a derailleur assembly comprising a base part and a holding part which is integrally molded with the base part in a protruding manner for receiving an end portion of the operation cable, the holding part provided with a hole formed therein for receiving and holding an end portion of the outer cable.

19. The transmission system of claim 18, wherein the derailleur assembly further comprises a link, and wherein the linking part is provided on, and protrudes from said link in the sprocket axis direction toward the work opening.

20. A transmission system, comprising:

a transmission case having a work opening formed therein;

a chain disposed in the transmission case;

a sprocket cluster disposed in the transmission case and comprising a plurality of transmission sprockets having different outer diameters, the sprockets of the sprocket cluster being arranged along a common sprocket axis;

a changing mechanism disposed in the transmission case, and an operation cable for use in operating the changing mechanism, the changing mechanism being operable to move the chain in an axial direction of the sprocket cluster such that the chain moves from one transmission sprocket to another among the sprocket cluster in response to movement of the operation cable, the operation cable being detachably linked to the changing mechanism; and a cap which is detachably secured over the work opening to plug and protectively cover the work opening, the cap configured and arranged to be removable from the transmission case without requiring removal of any other component;

wherein the transmission case comprises an axially-directed case wall in which the work opening is formed, and a radially-directed case wall having an operation opening formed therein through which an end portion of the operation cable extends;

wherein the operation cable and the linking part of the changing mechanism may be accessed via the work opening in the axially-directed case wall of the transmission case component to permit connection or disconnection of the operation cable, and wherein the chain may be lubricated via the work opening; and wherein a transmission sprocket having the largest outer diameter among the sprocket cluster is located closest in the sprocket axis direction to the work opening.

* * * * *